United States Patent [19]

Kraft et al.

[11] Patent Number: 4,902,953
[45] Date of Patent: Feb. 20, 1990

[54] MOTORIZED WINDOW BLIND ELECTRICAL ACTUATOR

[76] Inventors: David W. Kraft, 716 N. Third, Bozeman, Mont. 59715; Lyle N. Eberhardt, 8420 Starling Dr., Bozeman, Mont. 59715; Lee E. Cannon, 3550 Stucky Rd., Bozeman, Mont. 59715

[21] Appl. No.: 234,183

[22] Filed: Aug. 19, 1988

[51] Int. Cl.⁴ .................................. E05F 15/14
[52] U.S. Cl. ........................ 318/663; 318/434; 318/436; 318/469
[58] Field of Search ........... 318/434, 436, 474, 640, 318/663, 666, 286, 466, 467, 468, 469

[56] References Cited

U.S. PATENT DOCUMENTS

| | | | |
|---|---|---|---|
| 4,112,343 | 9/1978 | Douglas | 318/663 X |
| 4,471,275 | 9/1984 | Comeau | 318/474 X |
| 4,492,908 | 1/1985 | Stockle et al. | 318/640 X |
| 4,591,773 | 5/1986 | Numata | 318/663 |
| 4,712,053 | 12/1987 | Numata | 318/434 X |

FOREIGN PATENT DOCUMENTS

| | | | |
|---|---|---|---|
| 55-141996 | 11/1980 | Japan | 318/663 |
| 59-133615 | 8/1984 | Japan | 318/663 |
| 1270745 | 11/1986 | U.S.S.R. | 318/663 |

*Primary Examiner*—Bentsu Ro
*Attorney, Agent, or Firm*—Zarley McKee, Thomte, Voorhees & Sease

[57] ABSTRACT

A motorized window blind actuator including input means for receiving regulated voltage and first variable reference voltage signal. A motor having an output shaft which connects to the window blinds to open and close the window blinds is controlled by a controller/driver component. A transducer is operatively associated with the output shaft of the motor to assist in producing a second voltage reference signal which is related to the actual position of the motor output shaft, and in turn related to the actual position of the slats of the window blind. The first voltage reference signal is related to the desired setting and position of the window blind. First and second voltage reference signals are continually compared. If they are sufficiently different, the motor is directed by the controller/driver to adjust the window blinds until signals are sufficiently the same, or, until the output shaft of the motor hits physical limits which cause an over current situation resulting in stoppage of the motor.

10 Claims, 3 Drawing Sheets

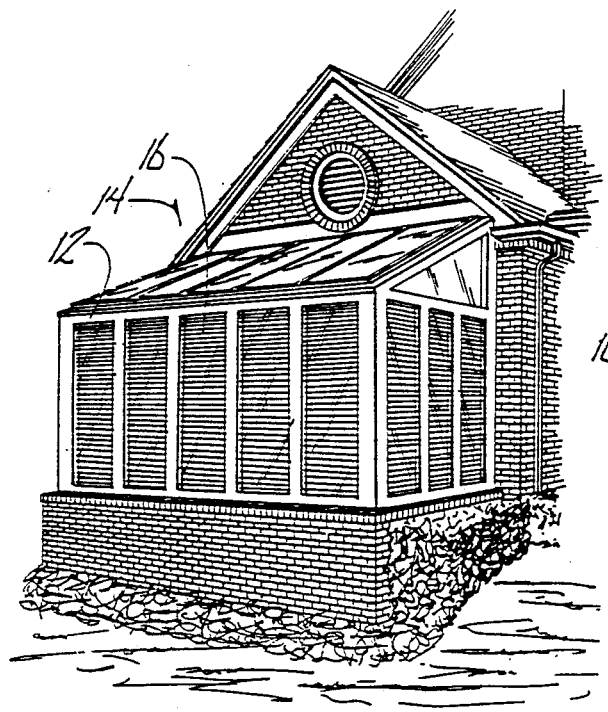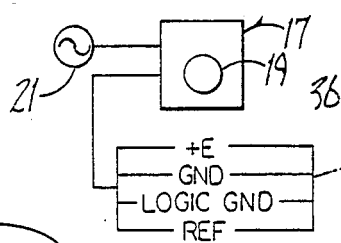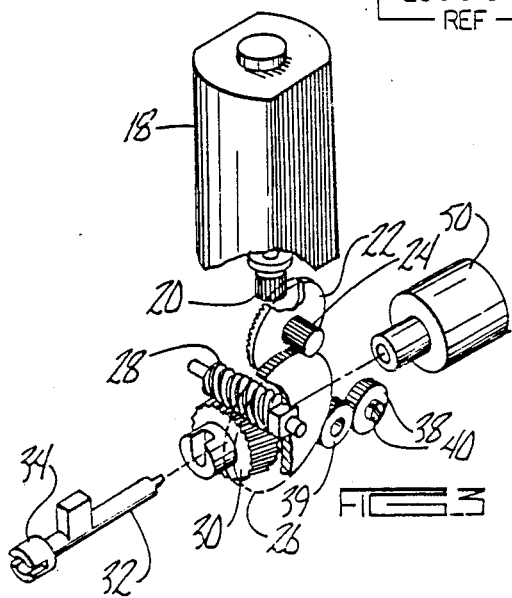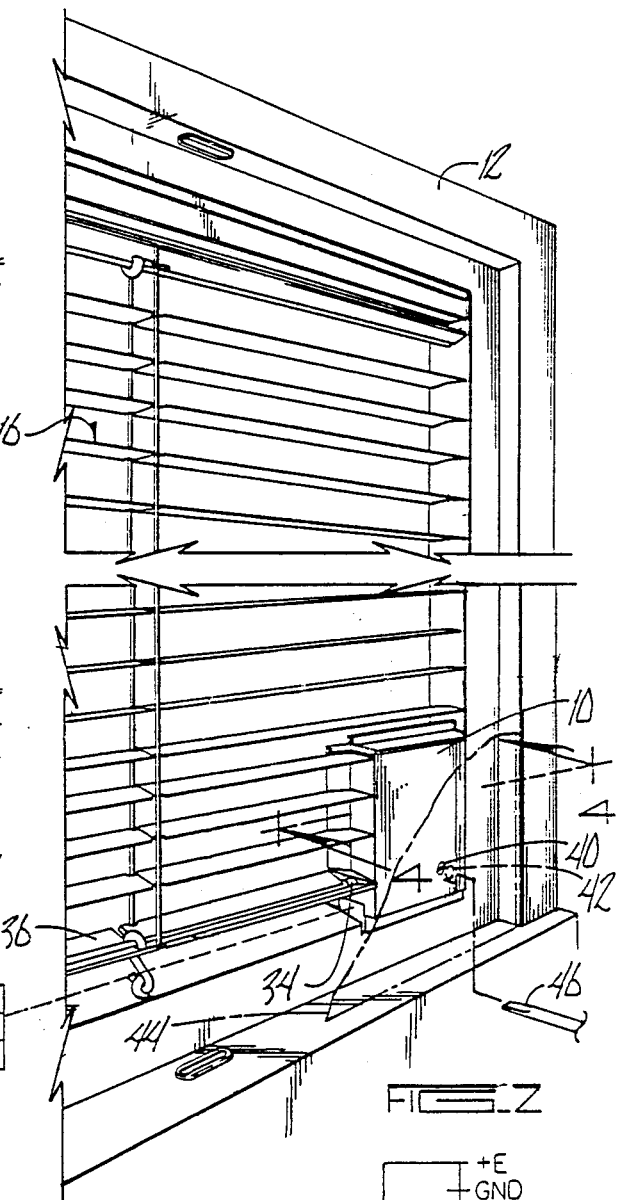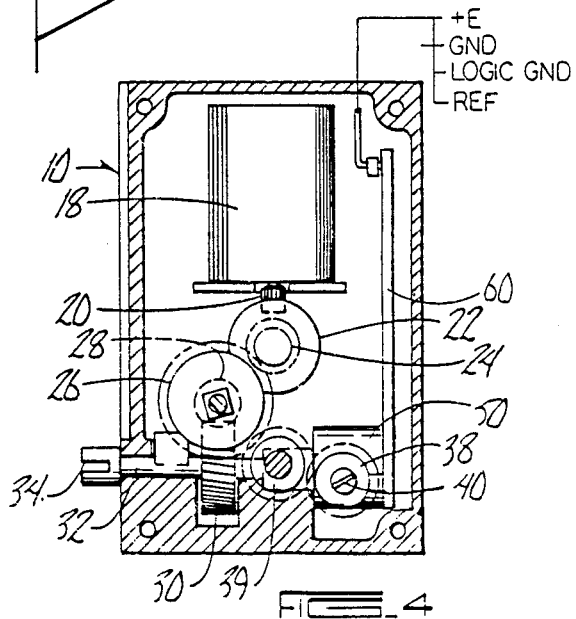

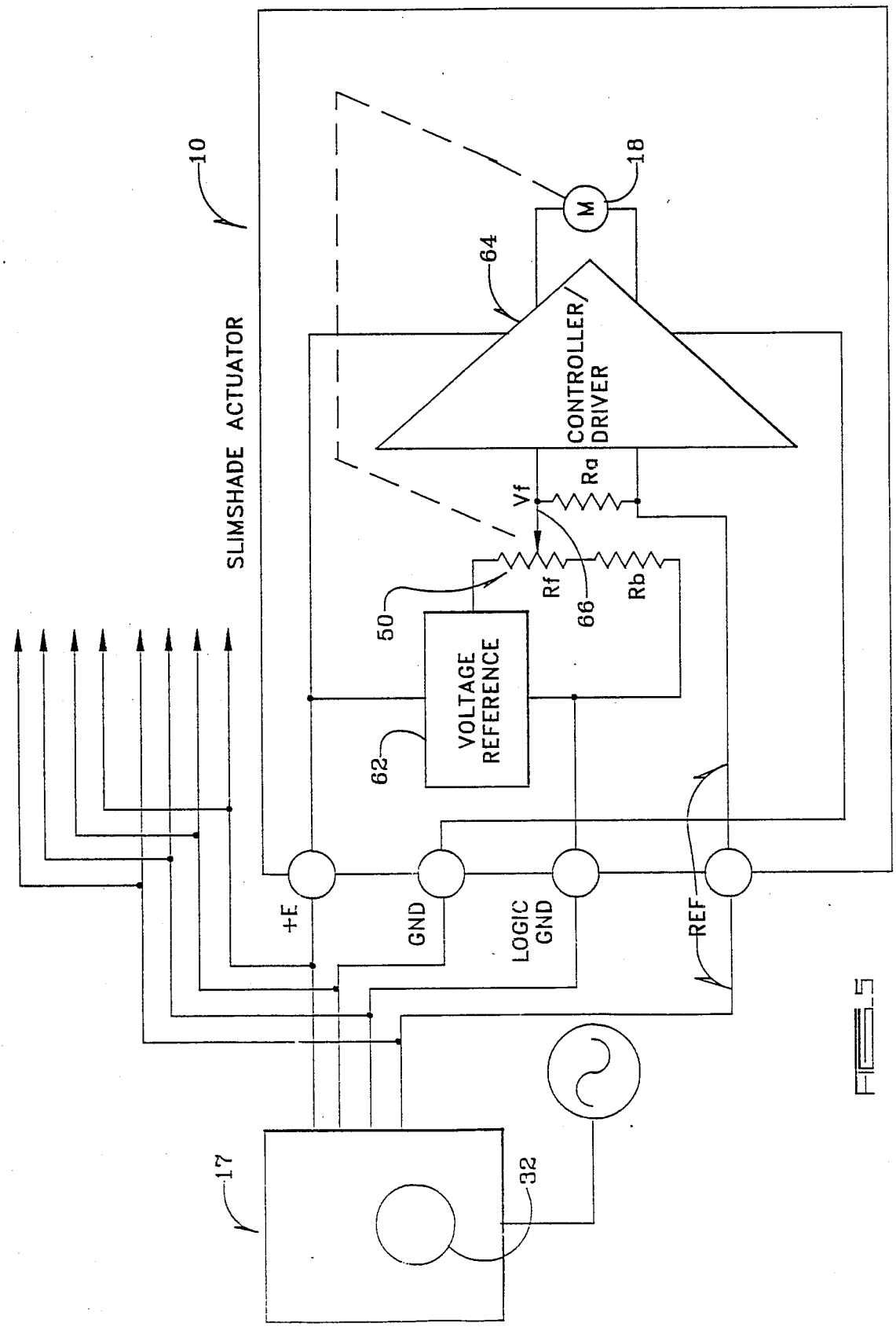

MOTORIZED WINDOW BLIND ELECTRICAL ACTUATOR

BACKGROUND OF THE INVENTION a. Field of the Invention

The present invention relates to window blinds, and specifically to electrically actuated and controlled window blinds.

b. Problems in the Art

Window blinds have long been utilized as window coverings to control light and heat into buildings. They present a good alternative to curtains and other window coverings, especially in this time of energy conservation consciousness. Window blinds are also highly adjustable, serve a variety of needs, and are aesthetically flexible for a variety of situations and uses.

Conventional window blinds utilize some sort of mechanical linkage to allow simultaneous adjustment of individual slats. Generally, this involves cords or rods extending from a single control element to operate all of the slats. The individual control element for each window blind must then be manually operated to achieve such adjustable control or one slat can be moved which causes all to move.

With all the advantages of window blinds, it is sometimes difficult and even cumbersome to adjust each window blind, especially if there are a number of them which need simultaneous adjustment.

It would therefore be advantageous to be able to control one or more window blinds by an easy to use electrical control, instructing one or more motors or actuators to move the blinds.

There have been attempts at such motorized window blinds. However, many of these attempts require complex or large mechanical or electrical elements which may have reliability and economy problems. Also, many attempts have safety problems because they utilize conventional household line current and voltage for their operation.

There is therefore a need in the art for motorized window blinds which improve over the state of the art. One such motorized window blind with manual override is disclosed in U.S. patent application Ser. No. 208,173, filed June 20, 1988, which is commonly owned with the present application and is incorporated by reference herein. By referring to that application, it can be seen that there has been developed a motorized window blind which is safe, reliable, compact, and minimally obtrusive with respect to the window. However, such a motorized window blind requires electrical control and actuation which meets not only those objectives, but has sufficient power to handle sticking or binding of the window blind, and yet is economical, compact, safe, and flexible. Such circuitry also needs to be economical to manufacture, assemble, install and maintain; along with being easy to operate.

It is therefore the principle object of the present invention to provide a motorized window blind actuator system which improves over or solves the problems and deficiencies in the art.

A further object of the present invention is to provide an actuator system as above described which is efficient and reliable.

Another object of the present invention is to provide an actuator system as above described which is non-complex, but is flexible to be adapted for different motorized window blinds, and different motorized window blind functions.

A further object of the present invention is to provide an actuator system as above described which is compact and economical.

Another object of the present invention is to provide an actuator system as above described which supplies sufficient electrical power for the motorized window blinds, yet is safe for household use.

A further object of the present invention is to provide an actuator system as above described which can reliably adjust a motorized window blind between fully open and fully closed positions in small increments, and prevent over-adjustments in either direction.

These and other objects, features, and advantages of the present invention will become more apparent with reference to the accompanying specification and claims.

SUMMARY OF THE INVENTION

The present invention relates to electronic circuitry and components to actuate a motorized window blind. The actuator receives electrical power and a control signal from an external source. This control signal comprises a first reference voltage which is variable according to desired instructions from an operator or an automatic system. The actuator system creates a stable second reference voltage from regulated voltage obtained from an external source.

The window blinds have a slat or axle which, when rotated, opens and closes the entire blind. An electrical motor is mechanically linked to this slat. Additionally, an electrical transducer, such as a potentiometer, is also directly and operatively connected to the slat or to the shaft turning the slat. This transducer alters the second reference voltage according to position of the slat of the window blind. The circuitry, by a preset electrical element, adds a plus or minus voltage to the first reference voltage to create a voltage range or "window" on either side of the first reference voltage. The second reference voltage is then compared, in an electrical comparator, with the first reference voltage window. If it falls outside of the window, the actuator system operates to automatically control a servomotor to turn the slat of the window blind until the second reference voltage is changed to come within the window. Motor operation would then cease.

Enhancements for the actuator system include components to sense fully closed and fully open positions for the motorized window shades. It also includes protections from complications such as over-voltage, temperature effects, and other problems which might effect reliability of the system. Braking means can also be incorporated to ensure that operation of the motor stops when intended.

The actuator system of the invention therefore is a feedback system which takes instructions from an external control and converts that into reliable opening and closing of the window blind.

BRIEF DESCRIPTION OF THE DRAWINGS

FIG. 1 is perspective view of a house having Venetian blinds utilizing motorized window blind with manual override.

FIG. 2 is a fragmentary, enlarged perspective view of a motorized blind, including depiction of an external power supply and controller.

FIG. 3 is an exploded perspective view of the motor and gear components in the housing for the motorized window blind of FIG. 2.

FIG. 4 is a cross sectional view taken along line 4—4 of FIG. 2, depicting the motor, circuit board holding the actuator system circuitry, and potentiometer connected to the output shaft of the motor which connects to the window blind.

FIG. 5 is a diagrammatic view of the electrical circuitry of the invention as connected to an external power and control unit.

DETAILED DESCRIPTION OF THE PREFERRED EMBODIMENT

Figure 6:
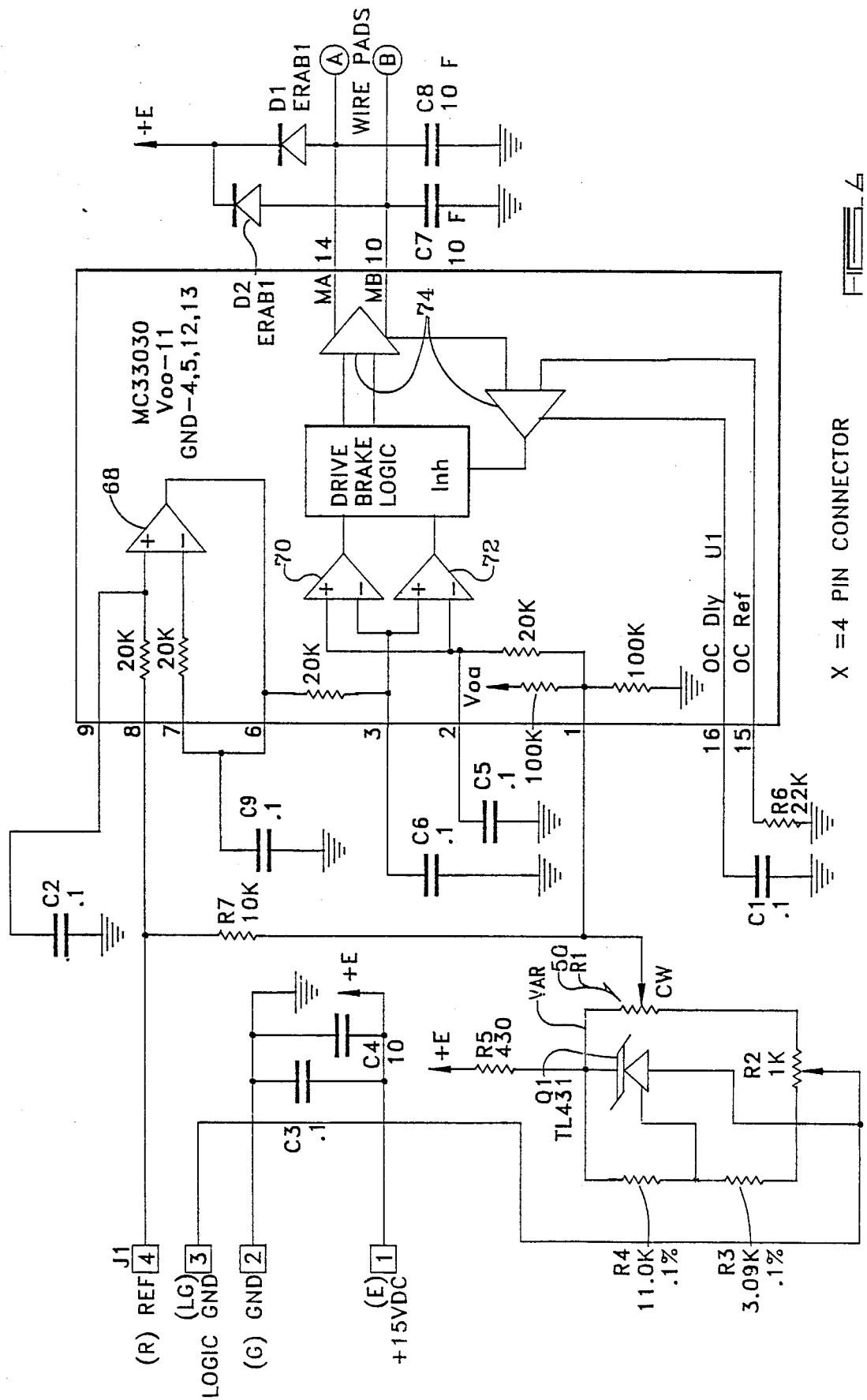
FIG. 6 is a detailed schematic of a preferred embodiment of the electrical circuitry of the invention.

The invention consists of an actuator system for electrically operating a motorized window blind. As is know by those of ordinary skill in the art, window blinds generally are mechanically operated by turning a control element such as a rod axle, or by otherwise pulling a cord or similar type of control element. They even may be controlled by turning one slat, which by interconnection with all others, causes operation of the complete blind. The present application relates to an actuator circuitry and system for operating motorized window blinds such as is set forth in commonly owned U.S. patent application Ser. No. 208,173, filed, June 20, 1988, which is incorporated by reference herein.

In order to aid in an understanding of the invention, a preferred embodiment of the invention will now be described, with reference to the drawings. Like elements will be referred to in all of the drawings by like reference numerals, unless otherwise noted.

By particular reference to FIGS. 1-4, the environment for the invention can be set. A motorized window blind operator is generally referred to by reference numeral 10 (see particularly FIG. 2). It is mounted within a window frame 12 in house 14 and operates slatted blinds 16. As can be seen, blind operator 10 is compact, minimally obtrusive, yet easily installable and serviceable.

FIG. 2 also depicts a power control 17, having a manually operated control knob 19. Power control 17 is connected to conventional household line current 21 and outputs a regulated voltage +E, and a reference voltage REF to blind operator 10. For more detailed description of such a power control 17, reference is taken to commonly owned U.S. patent application Ser. No. 234,199, by Kraft, Eberhardt, and Cannon entitled ELECTRICAL POWER AND CONTROL MEANS AND METHOD filed Aug. 19, 1988, which is incorporated by reference herein. Power control 17 allows the homeowner to provide safe and reliable power to one or more blind operators 10, and to issue instructions as to operation of slatted blind 16; namely, whether to open or close, and the extent thereof.

FIGS. 3 and 4 show in more detail the components of blind operator 10. A motor 18 drives a gear train assembly which rotates an output drive shaft 32, which is connectable to an end of slat 36 (see FIG. 2). Rotation of output drive shaft 32 therefore will cause concurrent adjustment of all slats of slatted blind 16.

FIGS. 3 and 4 also show that a potentiometer 50 is directly linked to correspond to movement of output drive shaft 32 and thus serves as a transducer for the rotational position of output drive shaft 32.

FIG. 4 also shows that blind operator 10 contains circuit board 60 which receives the inputs from power control unit 17 and contains the electrical components which receive information from potentiometer 50 and power control 17, and operates motor 18.

FIG. 5 diagrammatically depicts the overall circuitry and electrical connection of components to operate motor 18. As can be seen, a regulated voltage +E is input into the actuator circuitry and is directed to voltage reference subcircuit 62 and controller driver subcircuitry 64. As can be seen, controller driver subcircuit 64 directly controls servomotor 18.

Ground and logic ground from power control 17 are also connected to the actuator circuitry, as is a variable reference voltage 62 (REF), which is introduced to controller driver subcircuit 64. Voltage REF is variable by rotation of control knob 32 of power control 17, and is intended to give proportional control over the position of slatted blind 16 between open and closed position.

FIG. 5 shows schematically potentiometer 50 including resistor Rf and wiper arm 66. As explained above, potentiometer 50 is operatively connected to output drive shaft 32 which rotates in correspondence with operation of motor 18, and therefore changes the voltage input into controller driver subcircuit 64 emanating from voltage reference subcircuit 62.

Thus, as shown in FIG. 5, controller driver subcircuit 64 basically operates motor 18 from a feedback type arrangement whereby the first voltage reference signal created by voltage reference subcircuit 62 and varied by potentiometer 50 is compared to the first voltage reference signal originally coming from power control 17, and created as a result of rotation of control knob 19. When these two voltage reference signals differ sufficiently from one another, controller driver subcircuit 64 operates to drive motor 18 in a specified direction to correspond with the intended opening and closing of the slatted blinds 16 as intended by the user. Once the actual position of the slatted blinds 16 corresponds with the intended position coming from control knob 19, the controller driver 64 ceases operation of motor 18.

It is also to be understood, as shown in FIG. 5, that power control 17 can operate a plurality of blind operators 10, simply by wiring each blind operator 10 in parallel therewith. Limitations as to electrical power from power control 17 determine exactly how many blind operators 10 can be operated simultaneously, or otherwise.

More particularly with respect to FIG. 5, it is to be understood that the actuator circuitry is designed to position slat-type window shades, such as slatted blind 16 in FIGS. 1 and 2, from fully closed, to open, and to fully closed in the opposite direction (180° of motion) with approximately 6° increments of positioning resolution in-between. In the preferred embodiment, controller driver 64 is a monolithic DC servocontroller. It consists of an on-chip op amp and window comparator, over-voltage monitor, drive and brake logic with direction memory, power H-bridge capable of one amp, and independently programmable over-current monitor and shutdown delay.

Feedback resistor, which is potentiometer Rf, is mechanically linked directly to the output drive shaft 32 of the geared linkage from motor 18. It provides a feedback voltage Vf to controller driver subcircuit 64. Voltage Vf is nearly independent of temperature, cable IR drop, and power supply variations.

Voltage reference subcircuit 62 provides a stable bias voltage for generation of the voltage Vf. Utilizing a separate logic ground eliminates IR drop that would effect feedback stability if motor current were allowed to flow in this ground.

When a voltage is maintained at the REF input, motor 18 will run until feedback voltage Vf falls within an internal null window, which is dynamically centered about the REF voltage. Furthermore, if the REF input is opened, resistor Ra will pull Vr to the same potential as Vf and motion of motor 18 will be terminated. Thus, for example, if control knob 32 is not actuated to send the REF voltage to blind operator 10, motor 18 will not run and the blinds will remain in their set position.

Enhancements to the system are also available. Controller driver subcircuit 64 will also stop operation of motor 18 if an over-current condition is detected. This enhancement is utilized to shut off motor operation when slatted blinds 16 reach either of the opposite fully closed positions. Mechanical stops are utilized on the output drive shaft 32 which correspond with approximately the opposite closed positions of slatted blind 16. Thus, when the stops are encountered, motor 18 stalls, and overcurrent is detected (at approximately 0.45 A). Thus, the invention eliminates the possibility of the motor 18 forcing slatted blind 16 past a sufficiently closed position which could damage or misalign slatted blind 16.

It is to be further understood that internal logic prevents motion attempts continuing in the direction encountered by one of the mechanical stops until motion has been initiated in the opposite direction. Once one of the physical stops on output drive shaft 32 has been encountered, over-current is detected, motor 18 is stopped, and no further motion in that direction will be attempted.

For further understanding of the invention, reference is again taken to concurrently owned and co-pending U.S. patent application Ser. No. 234,199, Kraft, Eberhardt, and Cannon, entitled ELECTRICAL POWER AND CONTROL MEANS AND METHOD, filed Aug. 19, 1988, which discusses operation of power control 17, and interface with electrical components such as blind operator 10. It also discusses operation of plurality of blind operators 10, including some of the operation features and enhancements.

FIG. 6 provides a detailed electrical schematic of one preferred embodiment of the invention. Functionally, the circuitry of FIG. 6 corresponds with what was shown and described with respect to FIG. 5. Motor 18 is connected at wire pad connectors A and B and consists of a fractional horsepower DC servomotor. As previously described, the command or reference voltage and power for blind operator 10 are supplied externally from power control 17 as shown in FIGS. 2 and 5. Potentiometer 50 provides the position feedback voltage by being directly linked to output drive shaft 32 which is gear driven by motor 18.

Voltage REF is applied to pin 8 of electrical component U1 and buffered by an internal op amp 68, producing a filtered voltage at pin 3 of device U1 by utilizing capacitors C2, C6, and C9. Component U1 dynamically adds a positive and negative 105 mV offset voltage to the voltage at pin 3 to serve as the separate positive and negative thresholds of two internal comparators 70 and 72. The positive and negative thresholds establish the inposition tolerance commonly referred to as the null window or dead zone of the system. The dead zone in the preferred embodiment is the total of the two offsets or nominally 210 mV.

Thus, if the feedback voltage created by potentiometer 50 at device U1 pin 1 falls outside the null window, motor 18 will be driven in a corrective direction until the null window condition is satisfied (or an over current or over voltage condition is detected by the system).

Additionally, if voltage REF is open (in its high impedance state) which occurs when no first reference voltage signal is given to blind operator 10, resistor R7 will pull pin 8 of device U1 to the same voltage as its pin 1 and the dead zone will also be detected. Thus, motor 18 will not operate when no voltage REF is received by an internal controller such as power control 17.

In the system of the preferred embodiment of the invention, motor braking is supplied to motor 18 by device U1 and diodes D1 and D2 to quickly stop motor 18 whenever the dead zone is entered. This is needed to prevent motor 18 from coasting through the null window possibly resulting in servo oscillations. In addition, diodes D1 and D2 serve to prevent motor inductive kickback from damaging the output H-bridge 74, while capacitors C7 and C8 serve to filter motor noise.

Precise end of travel limits are established by mechanically limiting output drive shaft 32 to 180° of travel. To ensure that these positions can be attained, voltage REF coming into blind operator 10 must be beyond the voltage extremes provided by feedback potentiometer 50. If this is satisfied, since motor 18 will stall, an over-current monitor feature of component U1 is used to detect the transversing extremes. Resistor R6 sets the over-current detection point (22 K = 0.4A) and capacitor C1 determines the amount of time current can exceed this value before H-bridge 74 is disabled (0.1uF=0.136 sec.). An over-current latch is reset by requesting motor 18 to reverse directions or cycling power.

Feedback voltage potentiometer R1 (potentiometer 50) is biased by a temperature stable voltage reference VRA, generated by bi-voltage reference Q1 and resistors R4, R3, and R2. By requiring a separate wire logic ground (GND), motor current does not alter VRA which would effect system positioning and stability. In the preferred embodiment, it is to be understood that voltage +E coming into blind operator 10 can drop anywhere within the system or any of the connected components and GND can rise at blind operator 10 as much as 1.6V each with respect to power control 17. This is due to IR drop in the connecting wires.

In the preferred embodiment of the invention, to offset component tolerances, especially the inaccurate internal positioning of the resistive element in R1 with respect to the keyed output drive shaft 32, a second potentiometer is utilized. The center of the REF signal range (5.80V) should drive each blind operator 10 to the center of its travel. With R1 fixtured to the precise center of travel, potentiometer R2 can be factory-set to provide 5.8V at pin 1 of component U1. By doing so, minimal field adjustment by those installing blind operator 10 will be necessary. The nominal voltage reference range at component U1 pin 1 is 2.50V to 9.1V. This range of travel (6.6V) divided by the range of the dead zone (0.21V) determines the number of positioning increments that the system can resolve (31 increments). Thus, by simple arithmetic, it is seen that 31 increments in 180° of travel is approximately 5.8° of resolution.

Slatted blind 16 can therefore be rather minutely controlled in their adjustment.

It is to be understood that mechanical backlash and motor speed, which influence motor braking distance, effect the actual accuracy of positioning.

It is to be further understood that if regulated voltage +E exceeds 18V nominally, component U1 will detect an over-voltage condition and disable output bridge 74. Operation will resume when the supply falls to below approximately 17.4V.

It therefore can be seen that the preferred embodiment of the invention achieves at least all of its stated objectives. This included preferred embodiment is given by way of example only, and not by way of limitation to the invention, which is solely described by the claims herein. Variations obvious to one skilled in the art will be included within the invention defined by the claims.

For example, in the preferred embodiment, the Controller/Driver circuitry (component U1 in FIG. 6) can be a Motorola DC servo motor Controller/Driver (Silicon monolithic integrated circuit), Product No. MC33030, from Motorola Semiconductors, P.0. Box 20912, Phoenix, Ariz. 85036. Component Q1 and its ancillary components in FIG. 6 can be a Linear Integrated Circuit Adjustable Precision Shunt Regulator, Product No. TL431, from Texas Instruments, P.0. Box 31013, Dallas, Tex. 76304.

What is claimed is:

1. A motorized window blind actuator for a window blind having a motor operatively attached to the window blind to control opening and closing of the window blind by an output shaft means of the motor, comprising:

input means for receiving regulated electrical power and a first variable reference voltage signal, the first variable reference voltage signal being proportional to a desired position of the window blind between and including open and closed positions defined by end stop means;

feedback voltage means for producing a second variable reference voltage signal from the regulated electrical power;

connection means for connecting the output shaft means of the motor to the feedback voltage means, rotation of the output shaft means causing proportional change in the second variable reference voltage signal which is in turn proportional to the actual position of the window blind between and including the open and closed positions;

comparator means for comparing the first and second variable reference voltage signals and for producing a drive signal based on the comparison of the first and second variable reference voltage signals;

drive means connected to the motor, the drive means instructing the motor to rotate the output shaft means according to the drive signal to bring the first and second variable reference voltage signals within a predetermined range to cause the window blind to move to the desired position; and over-current sensing means for sensing circuit current above a pre-set level for over a predetermined time, including current monitoring means and timing means, the over-current sensing means disabling the driver means upon the window blind reaching an end stop open or closed position, or jamming or sticking between an open and a closed position.

2. The actuator of claim 1 wherein the feedback voltage means includes a linear adjustable precision shunt regulator.

3. The actuator of claim 1 wherein the feedback voltage means comprises a potentiometer.

4. The actuator of claim 1 wherein the comparator means includes a voltage comparator.

5. The actuator of claim 4 further including means for adding a plus and minus voltage to the first variable reference voltage signal.

6. The actuator of claim 5 wherein the comparator means compares the second variable reference voltage signal to a voltage null window range created by the addition of the plus and minus voltage to the first variable voltage reference signal.

7. The actuator of claim 1 further including an over-voltage monitor means for protecting the actuator from excessive voltage.

8. The actuator of claim 1 wherein the comparator means and the drive-means are included in a direct current servo motor controller/driver means.

9. The actuator of claim 1 further includes an over-current monitor means for signaling an end limit for travel of the motor.

10. The actuator of claim 1 wherein the driver means includes means for automatically controlling change in rotation of the output shaft means of the motor.

* * * * *